(12) United States Patent
Bai et al.

(10) Patent No.: US 12,170,918 B2
(45) Date of Patent: Dec. 17, 2024

(54) CAPABILITY FOR L1/L2 NON-SERVING CELL REFERENCE SIGNAL MEASUREMENT AND REPORTING

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 517 days.

(21) Appl. No.: 17/453,829

(22) Filed: Nov. 5, 2021

(65) Prior Publication Data

US 2022/0256381 A1     Aug. 11, 2022

Related U.S. Application Data

(60) Provisional application No. 63/147,059, filed on Feb. 8, 2021.

(51) Int. Cl.
*H04W 24/10* (2009.01)
*H04W 56/00* (2009.01)
(Continued)

(52) U.S. Cl.
CPC ......... *H04W 24/10* (2013.01); *H04W 56/001* (2013.01); *H04W 72/1263* (2013.01); *H04W 72/542* (2023.01)

(58) Field of Classification Search
CPC .......... H04W 16/28; H04W 72/12; H04L 5/00
See application file for complete search history.

(56) References Cited

U.S. PATENT DOCUMENTS

2019/0319748 A1* 10/2019 Nam ................... H04W 72/563
2020/0359243 A1   11/2020 Zhou et al.
2024/0098541 A1*  3/2024 Matsumura ........... H04W 24/10

OTHER PUBLICATIONS

CATT: "Rel-16 Work Item Exception for CSI-RS Based L3 Measurement", 3GPP Draft, 3GPP TSG RAN meeting #88e, RP-201340, 3GPP, Mobile Competence Centre, 650, Route Des Lucioles, F-06921 Sophia-Antipolis Cedex, France, vol. TSG RAN, No. Electronic Meeting, Jun. 29, 2020-Jul. 3, 2020 Jul. 3, 2020 (Jul. 3, 2020), XP051906726, 2 pages, Retrieved from the Internet: URL: https://ftp.3gpp.org/tsg_ran/TSG_RAN/TSG_88e/Docs/RP201340.zip RP-201340 revised NR_CSIRS_L3_meas_Exception_v3.docx [retrieved on Jul. 3, 2020] the whole document.

(Continued)

*Primary Examiner* — Sulaiman Nooristany
(74) *Attorney, Agent, or Firm* — Procopio, Cory, Hargreaves & Savitch

(57) ABSTRACT

An apparatus, e.g., a UE, is disclosed. The apparatus may transmit, to a serving cell, UE capability information for performing L1/L2 measurements of at least one target RS received from a non-serving cell and reporting measurement information. The apparatus may receive, based on the transmitted UE capability information, a configuration including a TCI state scheduling the UE to receive the at least one target RS from the non-serving cell based on at least one source RS associated with the TCI state, and to perform the L1/L2 measurements of the at least one target RS. The number of RS reported in the measurement report may be based on at least one of a UE capability, an indication received from the serving cell, a pre-configuration, or an indication received from the serving cell in which the indication is within the UE capability.

30 Claims, 10 Drawing Sheets

(51) Int. Cl.
*H04W 72/1263* (2023.01)
*H04W 72/542* (2023.01)

(56) References Cited

OTHER PUBLICATIONS

International Search Report and Written Opinion—PCT/US2022/011856—ISA/EPO—Apr. 26, 2022.

Mediatek Inc: "Enhancement on Multi-Beam Operation", 3GPP Draft, 3GPP TSG RAN WG1 #104-e, R1-2100588, 3GPP, vol. RAN WG1, No. e-Meeting, Jan. 25, 2021-Feb. 5, 2021 Jan. 19, 2021 (Jan. 19, 2021), XP051971059, 27 Pages, Retrieved from the Internet: URL: https://ftp.3gpp.org/tsg_ran/WG1_RL1/TSGR1_104-e/Docs/R1-2100588.zip R1-2100588_MB_final.docx [retrieved on Jan. 19, 2021] Section 2.1.5, Proposals 11-13, Section 2.3, Section 2.3.4, Section 2, 2.2, 2.2.1, 2.2.2, 2.3.2, pp. 7-8, paragraph [2.1.8]—paragraph [2.2.1], paragraph [2.3.4].

Samsung: "Multi-Beam Enhancements", 3GPP Draft, 3GPP TSG RAN WG1 #104-e, R1-2101186, 3GPP, vol. RAN WG1, No. e-Meeting, Jan. 25, 2021-Feb. 5, 2021 Jan. 18, 2021 (Jan. 18, 2021), XP051971402, 24 Pages, Retrieved from the Internet: URL: https://ftp.3gpp.org/tsg_ran/WG1_RL1/TSGR1_104-e/Docs/R1-2101186.zip R1-2101186 Multi-Beam Enhancements Final.docx [retrieved on Jan. 18, 2021] Section 2.3, Section 2.2, Section 4, Section 4.3, Proposal 10, Sections 1-7, Appendix 1, pp. 6-7, section 3 Issue 2: Inter-cell mobility enhancements.

\* cited by examiner

CAPABILITY FOR L1/L2 NON-SERVING CELL REFERENCE SIGNAL MEASUREMENT AND REPORTING

CROSS REFERENCE TO RELATED APPLICATION(S)

This application claims the benefit of and priority to U.S. Provisional Application Ser. No. 63/147,059, entitled "Capability for L1/L2 Non-Serving Cell Reference Signal Measurement and Reporting" and filed on Feb. 8, 2021, which is expressly incorporated by reference herein in its entirety.

TECHNICAL FIELD

The present disclosure relates generally to communication systems, and more particularly, to measurement of reference signals received from a non-serving cell.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may transmit, to a serving cell, UE capability information for performing at least one of layer 1 (L1) or layer 2 (L2) (L1/L2) measurements of at least one target reference signal (RS) received from a non-serving cell and reporting measurement information. The apparatus may receive, based on the transmitted UE capability information, a configuration including a transmission configuration indicator (TCI) state scheduling the UE to receive the at least one target RS from the non-serving cell based on at least one source RS associated with the TCI state, and to perform the L1/L2 measurements of the at least one target RS.

In another aspect of the disclosure, a method, a computer-readable medium, and an apparatus are provided. The apparatus may be a serving cell. The apparatus may receive, from a UE, UE capability information for performing L1/L2 measurements of at least one target RS transmitted from a non-serving cell and reporting measurement information. The apparatus may transmit, to the UE based on the received UE capability information, a configuration including a TCI state scheduling the UE to receive the at least one target RS from the non-serving cell based on at least one source RS associated with the TCI state, and to perform the L1/L2 measurements of the at least one target RS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
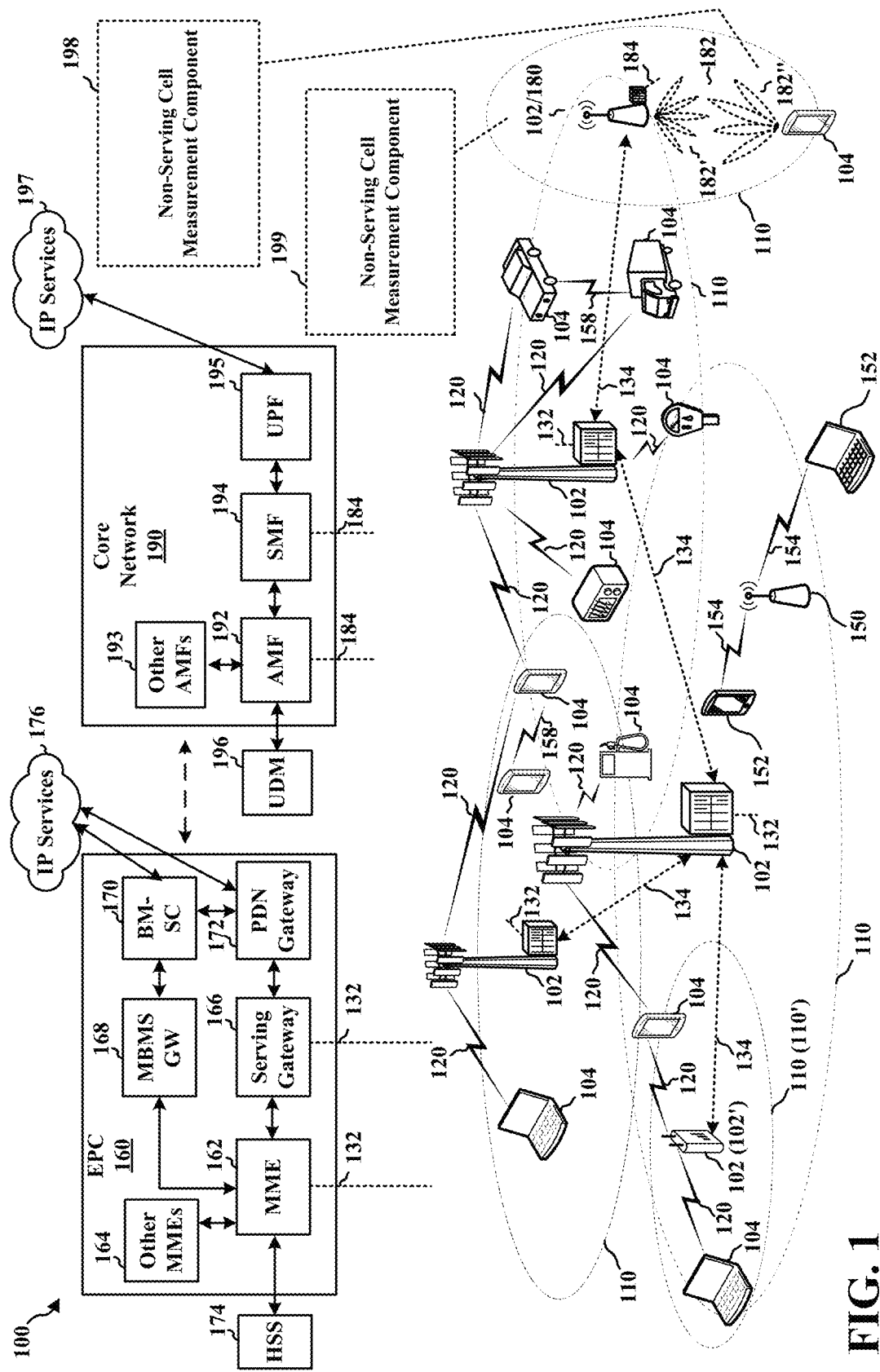
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a non-serving cell measurement component 198 that may be configured to transmit, to a serving cell, UE capability information for performing L1/L2 measurements of at least one target RS received from a non-serving cell and reporting measurement information. The non-serving cell measurement component 198 may be further configured to receive, based on the transmitted UE capability information, a configuration including a transmission configuration indicator (TCI) state scheduling the UE to receive the at least one target RS from the non-serving cell based on at least one source RS associated with the TCI state, and to perform the L1/L2 measurements of the at least one target RS. In certain aspects, the base station/serving cell 180 may include a non-serving cell measurement component 199 that may be configured to receive, from a UE, UE capability information for performing L1/L2 measurements of at least one target RS transmitted from a non-serving cell and reporting measurement information. The non-serving cell measurement component 199 may be further configured to transmit, to the UE based on the received UE capability information, a configuration including a TCI state scheduling the UE to receive the at least one target RS from the non-serving cell based on at least one source RS associated with the TCI state, and to perform the L1/L2 measurements of the at least one target RS. Although the following description may be focused on 5G NR, the concepts described herein may be applicable to other similar areas, such as LTE, LTE-A, CDMA, GSM, and other wireless technologies.

Figure 2:
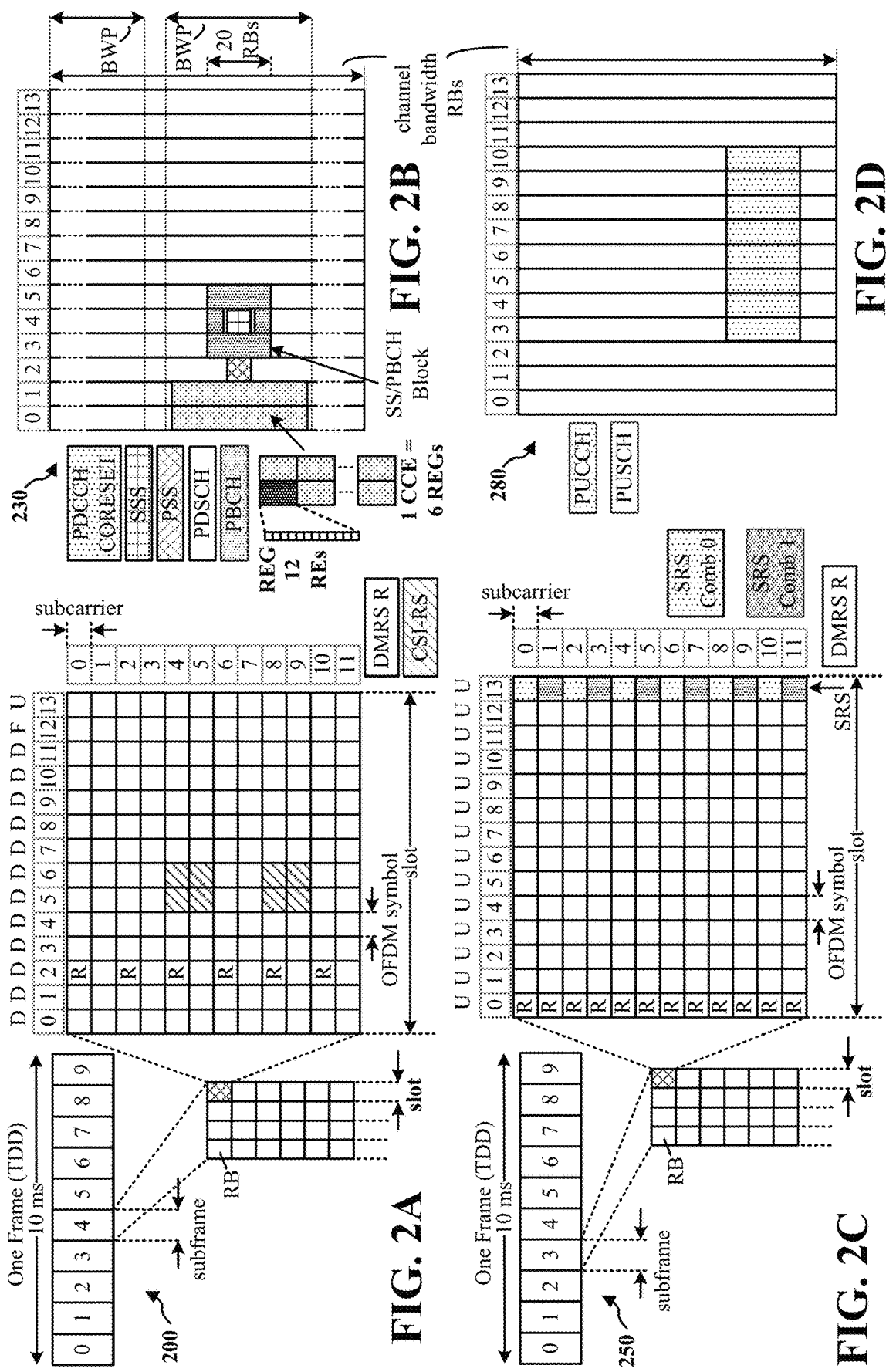
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms)

may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15 [\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
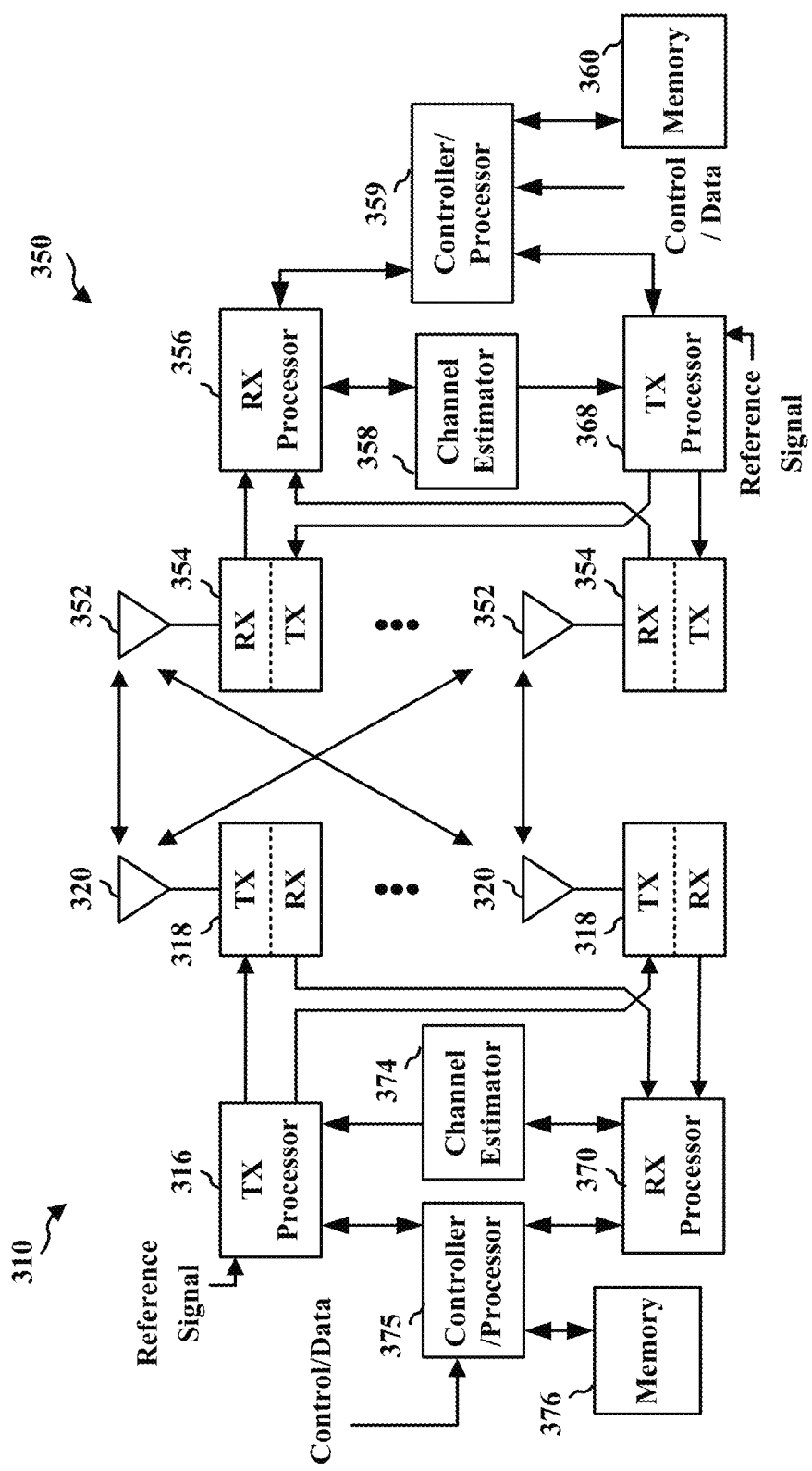
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

Enhancements to enable L1/L2 centric inter-cell mobility has been considered. The network architecture may include the non-standalone (NSA) architecture (i.e., LTE PCell and NR primary secondary cell "PSCell") and the standalone (SA) architecture. Intra-band carrier aggregation (CA) may be provided. Inter-band CA may also be included. Intra-RAT mobility may be provided. An intra-frequency scenario may be provided. The SSBs of non-serving cells may have the same center frequency and SCS as the SSBs of the serving cell. An SSB of a non-serving cell may be associated with a PCI different from the PCI of the serving cell. Support for the inter-frequency scenario may also be provided. Support for the intra-distributed unit (DU) (intra-DU) only mobility operation may be provided. Support for inter-DU mobility may be provided.

Measurement and reporting of non-serving RSs may be facilitated via incorporating non-serving cell info with some TCI(s), along with the necessary measurement and reporting scheme(s). Support of beam indication (TCI state update along with the necessary TCI state activation) for TCI(s) associated with non-serving cell RS(s) may be provided. Metrics for the measurement and reporting may include, e.g., L1 reference signal received power (RSRP) (L1-RSRP) or L3-RSRP or time- or spatial-domain-filtered L1-RSRP. A beam-level event-driven mechanism using serving cell RS and/or non-serving cell RS may be provided. The serving cell may be facilitated to provide configurations for non-serving cell SSBs via RRC. The configuration may include the time/frequency location, transmission, power, etc. Other information may be needed for inter-cell mobility. Non-serving cell SSB and non-serving cell RS can be part of the serving cell configuration.

A UE may be associated with a serving cell, and may monitor neighboring non-serving cells for mobility purposes (e.g., for cell reselection, handover, etc.). TCI states may only be associated with serving cell beams/RS. To enable L1/L2 centric inter-cell mobility, non-serving cell RS may be associated with TCI states for measurement and report of neighboring non-serving cells (other cells). Associating the non-serving cell RS with TCI states may provide several benefits. The existing L1-based measurement and report framework for the serving cell RS may be extended to cases of measurement and report of non-serving cell RS (other cell RS). Fast handover of data/control channels to TCI states of non-serving cell beams may be supported. Further, enhanced measurement of non-serving cell beams may be supported by associating aperiodic (AP) CSI-RS (AP-CSI-RS) or tracking RS (TRS) with TCI states associated with non-serving cells.

The UE may measure the SSB or the CSI-RS transmitted by neighboring non-serving cells for layer 3 (L3) mobility. In particular, the RS of the non-serving cells may be measured during an SSB based measurement timing configuration (SMTC) time period. Herein L1 may refer to the physical layer. L2 may refer to the MAC layer. L3 may refer to the RRC layer. According to aspects, a UE may report its capability associated with performing L1/L2 measurements of RS transmitted by non-serving cells to the serving base station, and the serving base station may configure the non-serving cells as well as the UE accordingly, so that the UE may perform L1/L2 measurements of RS transmitted by non-serving cells to enable L1/L2 centric inter-cell mobility.

In one configuration, for L1-RSRP measurement in connection with inter-cell beam management, the UE may measure SSB burst sets from multiple cells associated with different PCIs, where the SSB burst sets from the multiple cells may overlap in time. An SSB burst set may be a set of SSBs that are transmitted in a predefined window (e.g., a window lasting 5 ms). The SSBs in an SSB burst set may be associated with different beam directions. The maximum number of the SSB burst sets overlapping in time configured for the L1-RSRP measurement may be based on the UE capability. In another configuration, for a UE that does not support measuring the L1-RSRP based on SSB burst sets that overlap in time, the serving cell may not configure SSB burst sets from multiple cells that overlap in time for L1-RSRP measurement. In other words, based on, for example, a UE capability indication from the UE that the UE does not support measuring the L1-RSRP based on SSB burst sets that overlap in time, the serving cell may configure, for the UE, SSB burst sets from multiple cells that do not overlap in time for L1-RSRP measurement.

Figure 4:
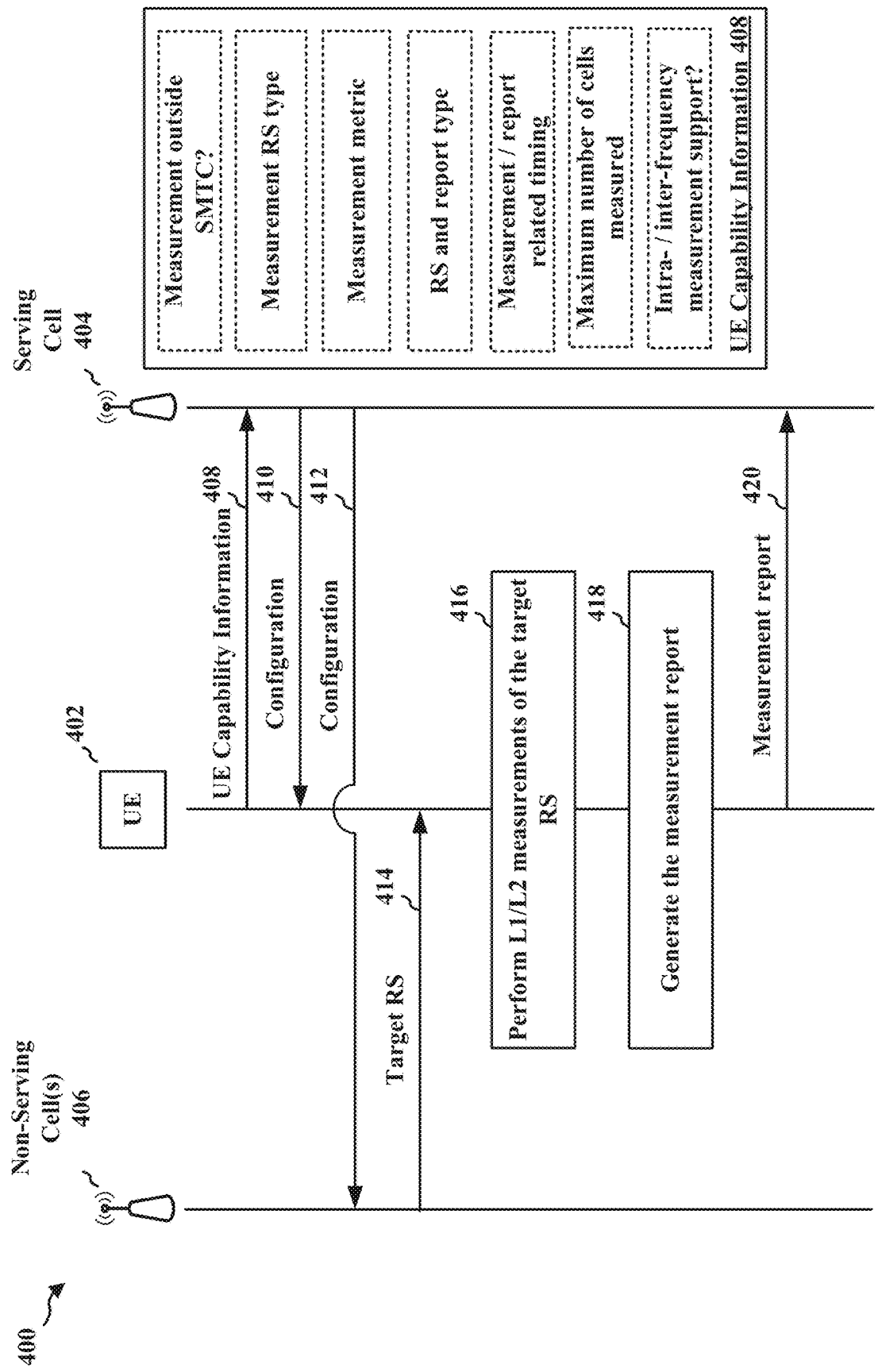
FIG. 4 is a diagram illustrating a communication flow according to aspects.

FIG. 4 is a diagram illustrating an example communication flow 400 according to aspects. At 408, the UE 402 may transmit to a serving cell 404, and the serving cell 404 may receive from the UE 402, UE capability information 408 for performing L1/L2 measurements of at least one target RS 414 received from a non-serving cell 406 and reporting measurement information.

At 410, the UE 402 may receive from the serving cell 404, and the serving cell 404 may transmit to the UE 402, based on the UE capability information 408, a configuration 410 including a TCI state scheduling the UE 402 to receive the at least one target RS 414 from the non-serving cell 406 based on at least one source RS associated with the TCI state, and to perform the L1/L2 measurements of the at least one target RS 414. The target RS 414 may be associated with the at least one source RS based on a quasi-co location (QCL) relationship associated with the TCI state.

At 414, the serving cell 404 may configure the non-serving cell 406 based on the UE capability information 408. In particular, the serving cell 404 may schedule the non-serving cell 406 to transmit the target RS 414, so that the UE 402 may perform L1/L2 measurements of the target RS 414 to enable L1/L2 centric inter-cell mobility. In some aspects, the serving cell 404 may configure the non-serving cell 406 through one or more intermediary entities (not shown). At 414, the non-serving cell 406 may transmit at least one target RS 414.

At 416, the UE 402 may perform, based on the received configuration 410, the L1/L2 measurements of the at least one target RS 414.

At 418, the UE 402 may generate the measurement report 420 including the measurement information. The measurement report may be generated to include measurement information for a number of RS associated with the non-serving cell 406.

At 420, the UE 402 may report to the serving cell 404, and the serving cell 404 may receive from the UE 402, a measurement report 420 including the measurement information associated with the performed L1/L2 measurements. The measurement report 420 may be utilized by the UE 402 and the serving cell 404 to enable L1/L2 centric inter-cell mobility.

An SSB of a non-serving cell 406 may be associated with a PCI different from the PCI of the serving cell 404. Hereinafter any reference to a non-serving cell 406 may also include a reference to a PCI associated with the non-serving cell 406.

The number of RS reported in the measurement report 420 may be limited by the UE 402. For the serving cell RS measurement report, the UE may report up to 4 RS with L1-RSRP, and for group based reports, the UE may report up to 2 beams in a report, where the beams in a report may be received simultaneously by the same Rx filter at the UE.

In different aspects, the maximum number of RS from non-serving cells reported in a single measurement report 420 may be based on 1) a UE 402 capability, 2) an indication received from the serving cell 404 by the UE 402, 3) a pre-configuration, or 4) an indication received from the serving cell 404 by the UE 402 in which the indication is within the UE 402 capability. In particular, the serving cell 404 may transmit the indication to the UE 402 via at least one of an RRC message, a MAC control element (CE) (MAC-CE), or DCI.

In one aspect, the serving cell 404 may transmit the configuration 410 to the UE 402 through an RRC message or a MAC-CE. For example, the serving cell 404 may configure the UE 402 with RRC signaling, and may update the configuration 410 with MAC-CEs.

In one aspect, the UE capability information 408 may include information indicating whether the L1/L2 measurements can be performed for an SSB from the non-serving cell 406 outside of an SMTC time period. In particular, the UE 402 may perform the L1/L2 measurements of an SSB from a non-serving cell during an SMTC time period. Further, some UEs 402 may additionally support performing the L1/L2 measurements of an SSB from a non-serving cell 406 in times outside of an SMTC time period. Accordingly, whether the UE 402 can perform the L1/L2 measurements of an SSB from the non-serving cell 406 outside of an SMTC time period may be indicated in the UE capability information 408.

In one aspect, the UE capability information 408 may include at least one measurement RS type supported for the L1/L2 measurements. The measurement RS type supported by the UE 402 may be the SSB, the CSI-RS, or both, from a non-serving cell 406. In particular, the CSI-RS may include CSI-RS for different purposes. For example, these may include CSI-RS for radio resource management (RRM), CSI-RS for TRS, CSI-RS for CSI, or CSI-RS for beam management (BM).

In one aspect, the UE capability information 408 may further include information indicating whether the CSI-RS supported for the L1/L2 measurements needs to be QCL with an RS. If a QCL relationship with an RS is not provided, a UE 402 may need to search through all combinations of receiver beams to locate the correct beam for receiving the CSI-RS. The searching and beam refinement overhead may be excessive for some UEs. Accordingly, whether the CSI-RS supported for the L1/L2 measurements needs to be QCL with an RS may be indicated in the UE capability information 408. In one aspect, the QCL relationship with an RS may be provided in the form of a QCL source associated with a TCI state. In another aspect, the QCL relationship with an RS may be indicated via another RS. The another RS may be either an SSB or a CSI-RS.

In one aspect, the UE capability information 408 may include at least one supported measurement metric. The at least one measurement metric may include at least one of an L1-RSRP, an L1 signal to interference plus noise ratio (SINR) (L1 SINR), an L3 RSRP (L3-RSRP), an L3 SINR, or another time- or spatial-domain-filtered L1-RSRP. An L3-RSRP may be generated by time-filtering (e.g., time-averaging) the L1-RSRP. Similarly, an L3 SINR may be generated based on the L1 SINR. The at least one measurement metric may be processed and/or utilized at one or both of the L1 or the L2 by the serving cell 404.

In one aspect, the UE capability information 408 may include at least one supported RS measurement type. The at least one supported RS measurement type may include a periodic RS measurement, a semi-persistent RS measurement, or an aperiodic RS measurement. The serving cell 404 may configure the non-serving cell 406 to transmit the at least one target RS 414 based on the supported RS measurement type.

In one aspect, the UE capability information 408 may include at least one supported measurement report type. The at least one supported report type may include a periodic measurement report 420, a semi-persistent measurement report 420, or an aperiodic measurement report 420. A periodic or a semi-persistent measurement report 420 may be scheduled for the UE 402 by the serving cell 404 via RRC signaling or a MAC-CE. An aperiodic measurement report 420 may be scheduled for the UE 402 by the serving cell 404 via DCI.

In one aspect, the UE capability information 408 may include a supported minimum time between reception at the UE 402 of DCI scheduling a measurement report 420 of the measurement information and transmitting from the UE 402 the measurement report 420 (Z). Accordingly, for example, when the aperiodic measurement report type is utilized, the serving cell 404 may schedule the transmission of the measurement report 420 from the UE 402 via DCI in such a way that the supported minimum time is observed.

In one aspect, the UE capability information 408 may include a supported minimum time between reception at the UE 402 of the at least one target RS 414 and transmitting a measurement report 420 of the measurement information (Z'). The time delay between reception of the at least one target RS 414 and transmitting the measurement report 420 may reflect the time it may take for the UE 402 to measure the target RS 414, compute the results, and generate the measurement report 420. Accordingly, the serving cell 404 may configure the non-serving cell 406 and the UE 402 to transmit the target RS 414 and to transmit the measurement report 420, respectively, in such a way that the supported minimum time is observed.

In one aspect, the UE capability information 408 may include a maximum number of non-serving cells 406 supported for the L1/L2 measurements. In one aspect, the maximum number of non-serving cells 406 supported for the L1/L2 measurements may be reported directly in the UE capability information 408. In another aspect, the maximum number of non-serving cells 406 supported for the L1/L2 measurements may be reported indirectly. For example, the UE capability information 408 may include a maximum number of cells, including both serving cells 404 and non-serving cells 406, supported for the L1/L2 measurements.

In one aspect, the UE capability information 408 may include information indicating whether at least one of inter-frequency L1/L2 measurements or intra-frequency L1/L2 measurements are supported. The L1/L2 measurements may be intra-frequency when the SSBs of non-serving cells have the same center frequency and subcarrier spacing (SCS) as the SSBs of the serving cell (e.g., the SSBs are associated with a same frequency grid). On the other hand, the L1/L2 measurements may be inter-frequency when the SSBs of non-serving cells have either a different center frequency or a different SCS from the SSBs of the serving cell (e.g., the SSBs are associated with different frequency grids).

In case the inter-frequency L1/L2 measurements are supported, the UE capability information 408 may further include a maximum number of RS or cells supported for the inter-frequency L1/L2 measurements. In case the intra-frequency L1/L2 measurements are supported, the UE capability information 408 may further include a maximum number of RS or cells supported for the intra-frequency L1/L2 measurements. In case both the intra-frequency L1/L2 measurements and the inter-frequency L1/L2 measurements are supported, the maximum number of RS or cells supported for the intra-frequency L1/L2 measurements may be different from the maximum number of RS or cells supported for the inter-frequency L1/L2 measurements. For example, the former may be greater than the latter.

In one aspect, the UE capability information 408 may be transmitted by the UE 402 to the serving cell 404 via an RRC message.

Figure 5:
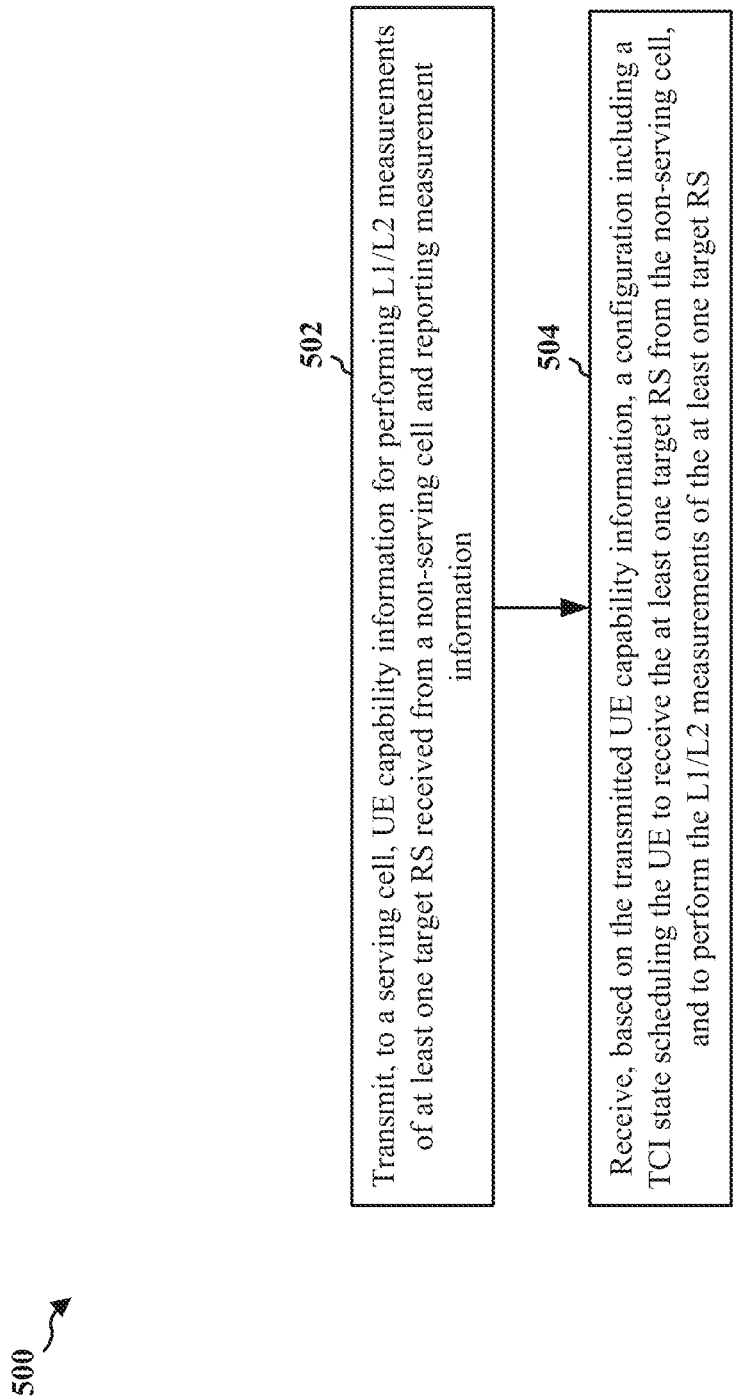
FIG. 5 is a flowchart of a method of wireless communication.

FIG. 5 is a flowchart 500 of a method of wireless communication. The method may be performed by a UE (e.g., the UE 104/350/402; the apparatus 902). At 502, the UE may transmit, to a serving cell, UE capability information for performing L1/L2 measurements of at least one target RS received from a non-serving cell and reporting measurement information. For example, 502 may be performed by the non-serving cell measurement component 940 in FIG. 9. Referring to FIG. 4, for example, the UE 402 may transmit, to a serving cell 404, UE capability information 408 for performing L1/L2 measurements of at least one target RS 414 received from a non-serving cell 406 and reporting measurement information.

At 504, the UE may receive, based on the transmitted UE capability information, a configuration including a TCI state scheduling the UE to receive the at least one target RS from the non-serving cell based on at least one source RS associated with the TCI state, and to perform the L1/L2 measurements of the at least one target RS. For example, 504 may be performed by the non-serving cell measurement component 940 in FIG. 9. Referring to FIG. 4, for example, the UE 402 may receive, based on the transmitted UE capability information 408, a configuration 410 including a TCI state scheduling the UE 402 to receive the at least one target RS 414 from the non-serving cell 406 based on at least one source RS associated with the TCI state, and to perform the L1/L2 measurements of the at least one target RS 414.

Figure 6:
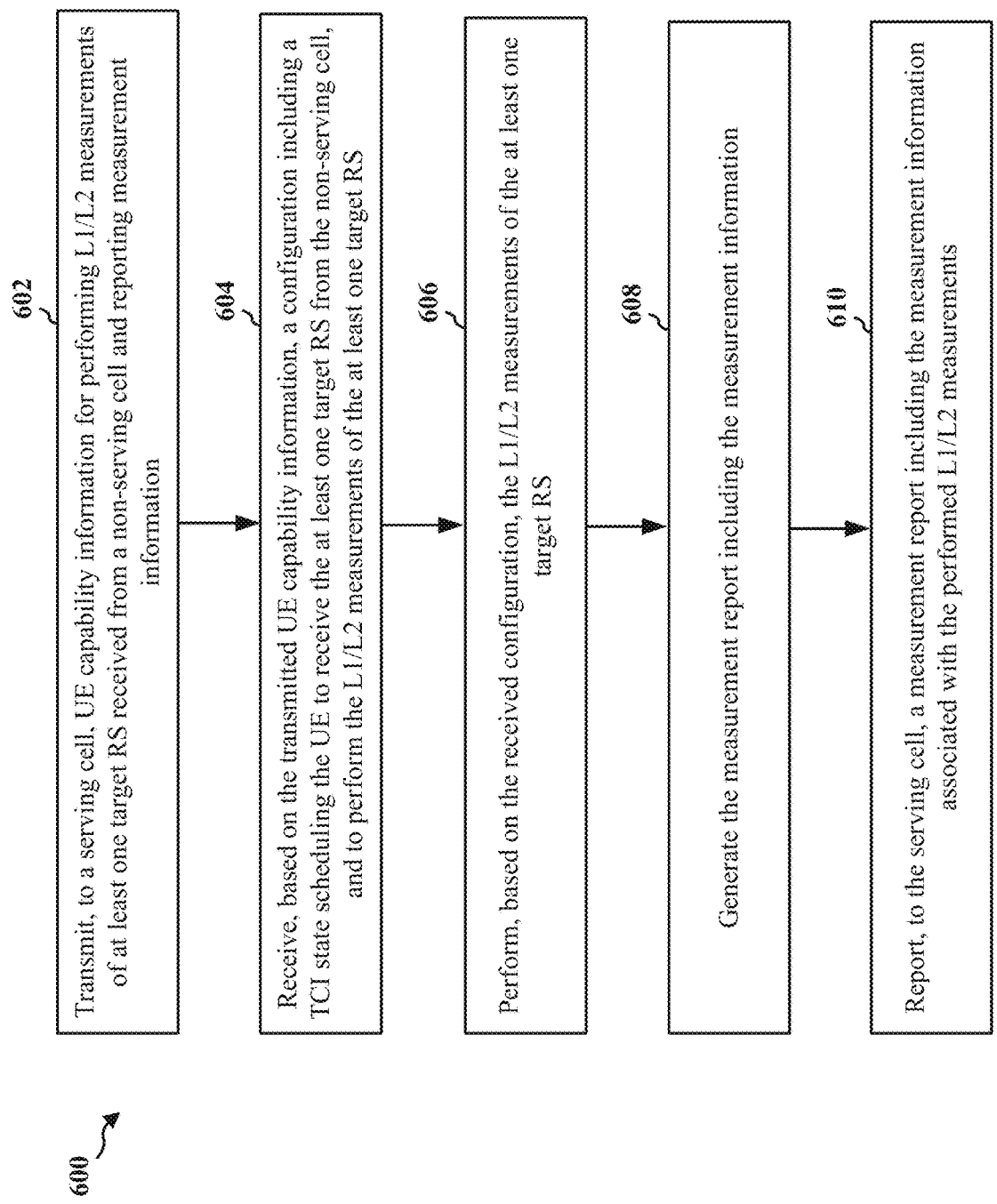
FIG. 6 is a flowchart of a method of wireless communication.

FIG. 6 is a flowchart 600 of a method of wireless communication. The method may be performed by a UE (e.g., the UE 104/350/402; the apparatus 902). At 602, the UE may transmit, to a serving cell, UE capability information for performing L1/L2 measurements of at least one target RS received from a non-serving cell and reporting measurement information. For example, 602 may be performed by the non-serving cell measurement component 940 in FIG. 9. Referring to FIG. 4, for example, the UE 402 may transmit, to a serving cell 404, UE capability information 408 for performing L1/L2 measurements of at least one target RS 414 received from a non-serving cell 406 and reporting measurement information.

At 604, the UE may receive, based on the transmitted UE capability information, a configuration including a TCI state scheduling the UE to receive the at least one target RS from the non-serving cell based on at least one source RS associated with the TCI state, and to perform the L1/L2 measurements of the at least one target RS. For example, 604 may be performed by the non-serving cell measurement component 940 in FIG. 9. Referring to FIG. 4, for example, the UE 402 may receive, based on the transmitted UE capability information 408, a configuration 410 including a TCI state scheduling the UE 402 to receive the at least one target RS 414 from the non-serving cell 406 based on at least one source RS associated with the TCI state, and to perform the L1/L2 measurements of the at least one target RS 414.

At 606, the UE may perform, based on the received configuration, the L1/L2 measurements of the at least one target RS. For example, 606 may be performed by the non-serving cell measurement component 940 in FIG. 9. Referring to FIG. 4, for example, the UE 402 may perform at 416, based on the received configuration 410, the L1/L2 measurements of the at least one target RS 414. At 610, the UE may report, to the serving cell, a measurement report including the measurement information associated with the performed L1/L2 measurements. For example, 610 may be performed by the non-serving cell measurement component 940 in FIG. 9. Referring to FIG. 4, for example, the UE 402 may report, to the serving cell 404, a measurement report 420 including the measurement information associated with the performed L1/L2 measurements.

At 608, the UE may generate the measurement report including the measurement information. The measurement report may be generated to include measurement information for a number of RS associated with the non-serving cell. The number of RS reported in the measurement report may be limited by the UE. For example, 608 may be performed by the non-serving cell measurement component 940 in FIG. 9. Referring to FIG. 4, for example, the UE 402 may generate at 418 the measurement report 420 including the measurement information. The measurement report 420 may be generated to include measurement information for a number of RS associated with the non-serving cell 406. The number of RS reported in the measurement report 420 may be limited by the UE 402.

In one configuration, the number of RS reported in the measurement report may be based on at least one of a UE capability, an indication received from the serving cell, a pre-configuration, or an indication received from the serving cell in which the indication is within the UE capability.

In one configuration, the configuration may be received through one of an RRC message or a MAC-CE. Referring to FIG. 4, for example, the configuration 410 may be received through one of an RRC message or a MAC-CE.

In one configuration, the UE capability information may include information indicating whether the L1/L2 measurements can be performed for an SSB from the non-serving cell outside of an SMTC time period.

In one configuration, the UE capability information may include at least one measurement RS type supported for the L1/L2 measurements. The at least one measurement RS type may include at least one of an SSB or a CSI-RS. In one configuration, the UE capability information may further include information indicating whether the CSI-RS supported for the L1/L2 measurements needs to be QCL with an RS. The RS may be one of a QCL source associated with a TCI state or another RS. In one configuration, the another RS may be one of an SSB or a CSI-RS.

In one configuration, the UE capability information may include at least one supported measurement metric. The at least one measurement metric may include at least one of an L1-RSRP, an L1 SINR, an L3-RSRP, or an L3 SINR. In one configuration, the UE capability information may include at least one supported measurement report type. The at least one supported report type may include a periodic measurement report, a semi-persistent measurement report, or an aperiodic measurement report.

In one configuration, the UE capability information may include a supported minimum time between reception of DCI scheduling a measurement report of the measurement information and transmitting the measurement report. In one configuration, the UE capability information may include a supported minimum time between reception of the at least one target RS and transmitting a measurement report of the measurement information.

In one configuration, the UE capability information may include a maximum number of cells supported for the L1/L2 measurements. The cells may include serving cells and non-serving cells. In one configuration, the UE capability information may include a maximum number of non-serving cells supported for the L1/L2 measurements.

In one configuration, the UE capability information may include information indicating whether at least one of inter-frequency L1/L2 measurements or intra-frequency L1/L2 measurements are supported. In one configuration, the UE capability information may further include a maximum number of at least one of RS or cells supported for the at least one of the inter-frequency L1/L2 measurements or the intra-frequency L1/L2 measurements.

In one configuration, the UE capability information may be transmitted to the serving cell via an RRC message. Referring to FIG. 4, for example, the UE capability information 408 may be transmitted to the serving cell 404 via an RRC message.

Figure 7:
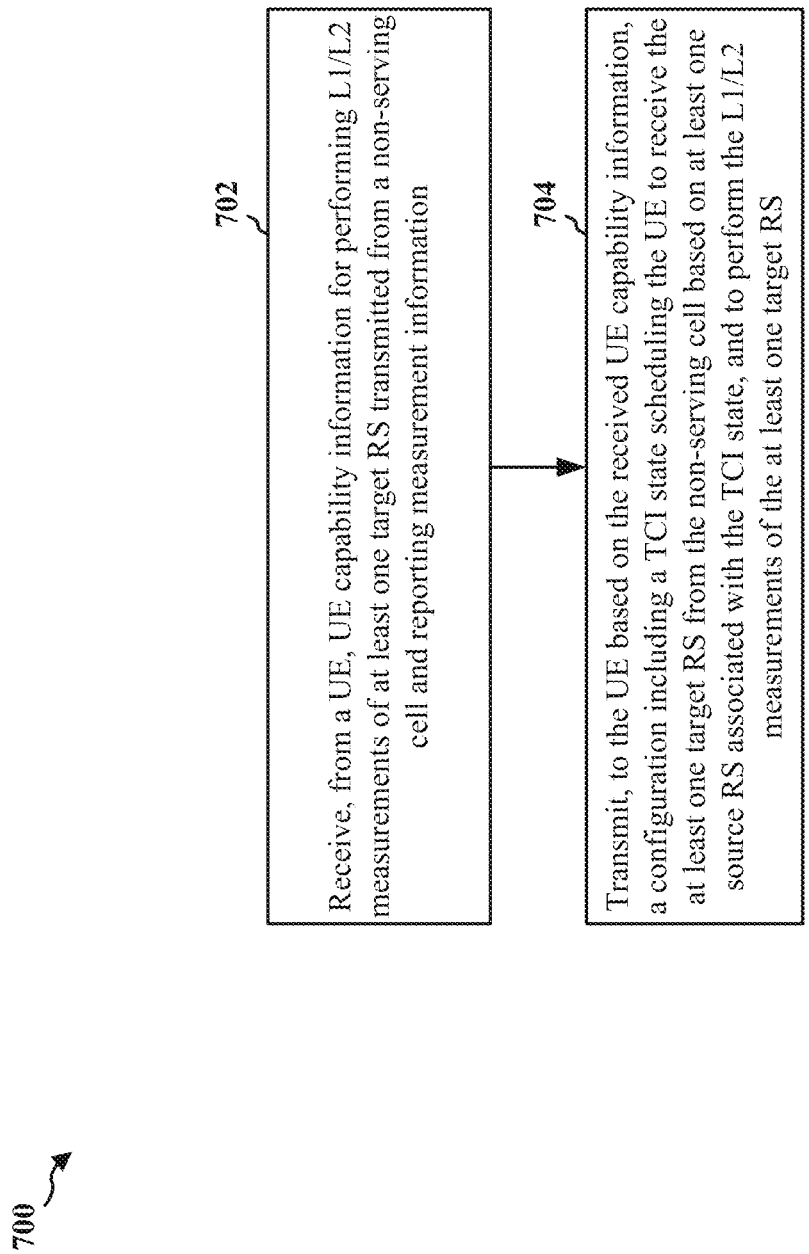
FIG. 7 is a flowchart of a method of wireless communication.

FIG. 7 is a flowchart 700 of a method of wireless communication. The method may be performed by a base station/serving cell (e.g., the base station/serving cell 102/180/310/404; the apparatus 1002). At 702, the serving cell may receive, from a UE, UE capability information for performing L1/L2 measurements of at least one target RS transmitted from a non-serving cell and reporting measurement information. For example, 702 may be performed by the non-serving cell measurement component 1040 in FIG. 10. Referring to FIG. 4, for example, the serving cell 404 may receive, from a UE 402, UE capability information 408 for performing L1/L2 measurements of at least one target RS 414 transmitted from a non-serving cell 406 and reporting measurement information.

At 704, the serving cell may transmit, to the UE based on the received UE capability information, a configuration including a TCI state scheduling the UE to receive the at least one target RS from the non-serving cell based on at least one source RS associated with the TCI state, and to perform the L1/L2 measurements of the at least one target RS. For example, 704 may be performed by the non-serving cell measurement component 1040 in FIG. 10. Referring to FIG. 4, for example, the serving cell 404 may transmit, to the UE 402 based on the received UE capability information 408, a configuration 410 including a TCI state scheduling the UE to receive the at least one target RS 414 from the non-serving cell 406 based on at least one source RS associated with the TCI state, and to perform the L1/L2 measurements of the at least one target RS 414.

Figure 8:
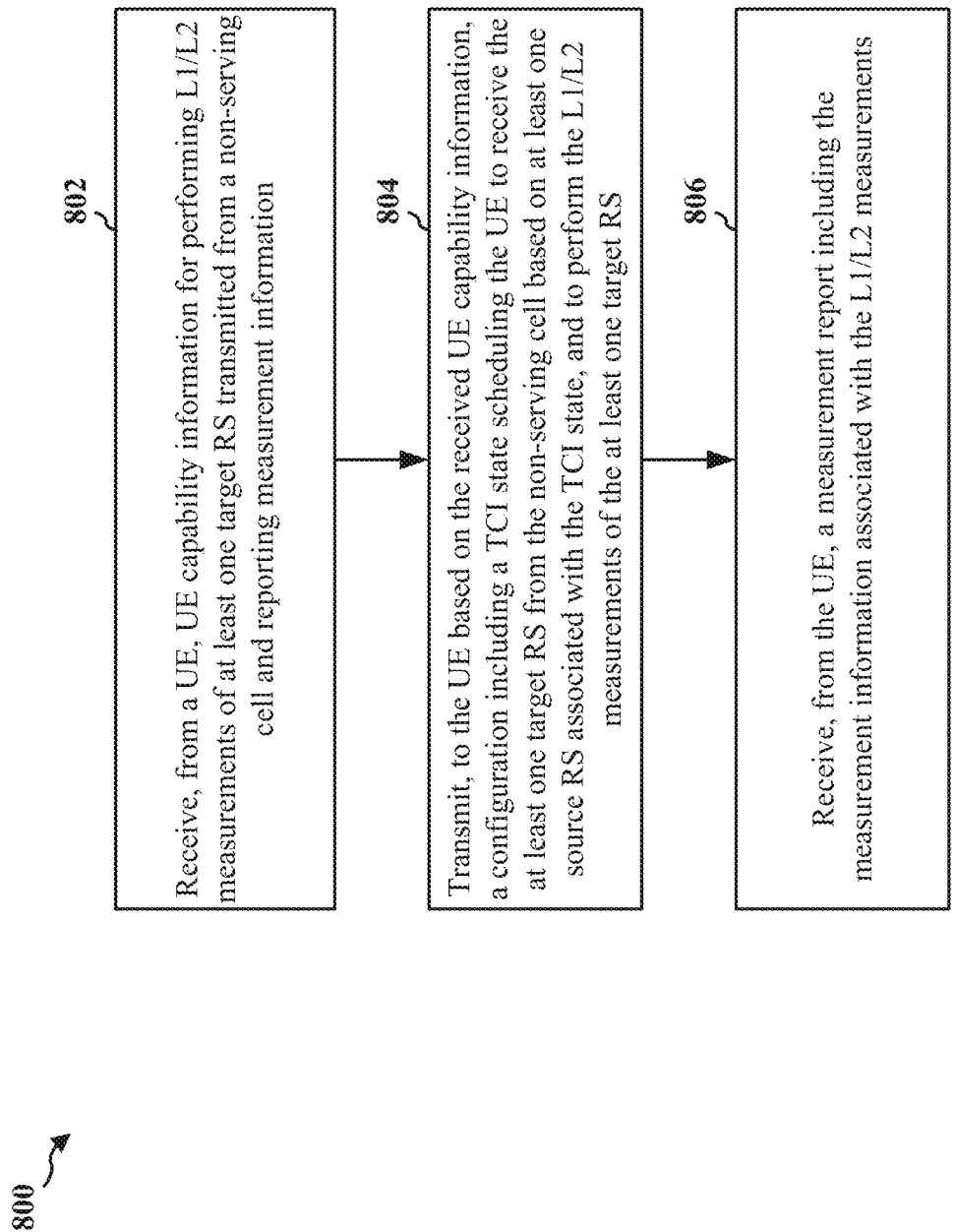
FIG. 8 is a flowchart of a method of wireless communication.

FIG. 8 is a flowchart 800 of a method of wireless communication. The method may be performed by a base station/serving cell (e.g., the base station/serving cell 102/180/310/404; the apparatus 1002). At 802, the serving cell may receive, from a UE, UE capability information for performing L1/L2 measurements of at least one target RS transmitted from a non-serving cell and reporting measurement information. For example, 802 may be performed by the non-serving cell measurement component 1040 in FIG. 10. Referring to FIG. 4, for example, the serving cell 404 may receive, from a UE 402, UE capability information 408 for performing L1/L2 measurements of at least one target RS 414 transmitted from a non-serving cell 406 and reporting measurement information.

At 804, the serving cell may transmit, to the UE based on the received UE capability information, a configuration including a TCI state scheduling the UE to receive the at least one target RS from the non-serving cell based on at least one source RS associated with the TCI state, and to perform the L1/L2 measurements of the at least one target RS. For example, 804 may be performed by the non-serving cell measurement component 1040 in FIG. 10. Referring to FIG. 4, for example, the serving cell 404 may transmit, to the UE 402 based on the received UE capability information 408, a configuration 410 including a TCI state scheduling the UE to receive the at least one target RS 414 from the non-serving cell 406 based on at least one source RS associated with the TCI state, and to perform the L1/L2 measurements of the at least one target RS 414.

At 806, the serving cell may receive, from the UE, a measurement report including the measurement information associated with the L1/L2 measurements. For example, 806 may be performed by the non-serving cell measurement component 1040 in FIG. 10. Referring to FIG. 4, for example, the serving cell 404 may receive, from the UE 402, a measurement report 420 including the measurement information associated with the L1/L2 measurements.

In one configuration, the measurement report may include measurement information for a number of RS associated with the non-serving cell. The number of RS reported in the measurement report may be limited by the UE. In one configuration, the number of RS reported in the measurement report may be based on at least one of a UE capability, an indication transmitted from the serving cell, a pre-configuration, or an indication transmitted from the serving cell in which the indication is within the UE capability.

In one configuration, the configuration may be transmitted through one of an RRC message or a MAC-CE. Referring to FIG. 4, for example, the configuration 410 may be transmitted through one of an RRC message or a MAC-CE.

In one configuration, the UE capability information may include information indicating whether the L1/L2 measurements can be performed for an SSB from the non-serving cell outside of an SMTC time period.

In one configuration, the UE capability information may include at least one measurement RS type supported for the L1/L2 measurements. The at least one measurement RS type may include at least one of an SSB or a CSI-RS. In one configuration, the UE capability information may further include information indicating whether the CSI-RS supported for the L1/L2 measurements needs to be QCL with an RS. The RS may be one of a QCL source associated with a TCI state or another RS. In one configuration, the another RS may be one of an SSB or a CSI-RS.

In one configuration, the UE capability information may include at least one supported measurement metric. The at least one measurement metric may include at least one of an L1-RSRP, an L1 SINR, an L3-RSRP, or an L3 SINR. In one configuration, the UE capability information may include at least one supported measurement report type. The at least one supported report type may include a periodic measurement report, a semi-persistent measurement report, or an aperiodic measurement report.

In one configuration, the UE capability information may include a supported minimum time between reception of DCI scheduling a measurement report of the measurement information and transmitting the measurement report. In one configuration, the UE capability information may include a supported minimum time between reception of the at least one target RS and transmitting a measurement report of the measurement information.

In one configuration, the UE capability information may include a maximum number of cells supported for the L1/L2 measurements. The cells may include serving cells and non-serving cells. In one configuration, the UE capability information may include a maximum number of non-serving cells supported for the L1/L2 measurements.

In one configuration, the UE capability information may include information indicating whether at least one of inter-frequency L1/L2 measurements or intra-frequency L1/L2 measurements are supported. In one configuration, the UE capability information may further include a maximum number of at least one of RS or cells supported for the at least one of the inter-frequency L1/L2 measurements or the intra-frequency L1/L2 measurements.

In one configuration, the UE capability information may be received from the UE via an RRC message. Referring to FIG. 4, for example, the UE capability information 408 may be received from the UE 402 via an RRC message.

Figure 9:
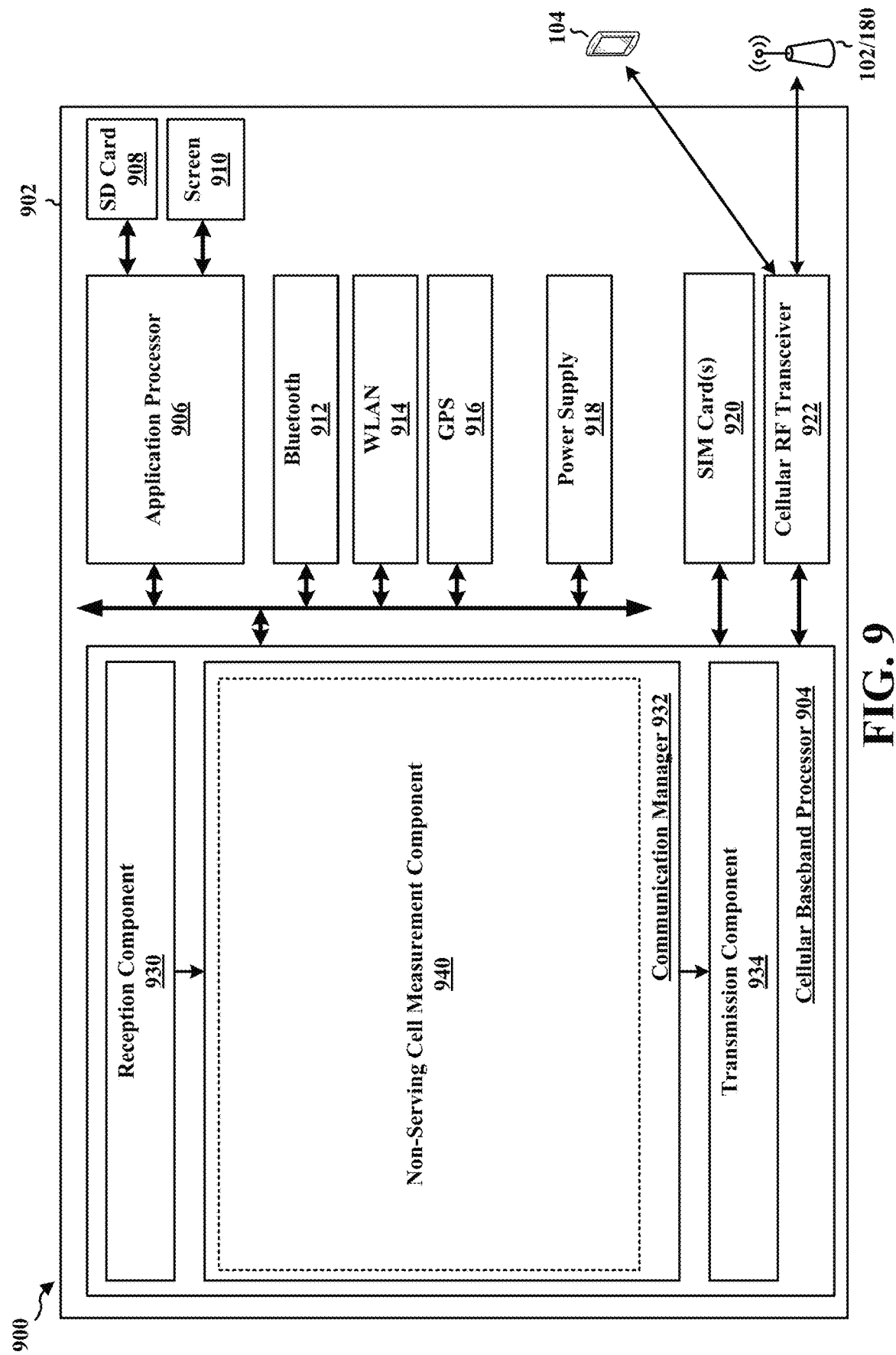
FIG. 9 is a diagram illustrating an example of a hardware implementation for an example apparatus.

FIG. 9 is a diagram 900 illustrating an example of a hardware implementation for an apparatus 902. The apparatus 902 may be a UE, a component of a UE, or may implement UE functionality. In some aspects, the apparatus 902 may include a cellular baseband processor 904 (also referred to as a modem) coupled to a cellular RF transceiver 922. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes a non-serving cell measurement component 940 that may be configured to transmit, to a serving cell, UE capability information for performing L1/L2 measurements of at least one target RS received from a non-serving cell and reporting measurement information, e.g., as described in connection with 502 in FIGS. 5 and 602 in FIG. 6. The non-serving cell measurement component 940 may be further configured to receive, based on the transmitted UE capability information, a configuration including a TCI state scheduling the UE to receive the at least one target RS from the non-serving cell based on at least one source RS associated with the TCI state, and to perform the L1/L2 measurements of the at least one target RS, e.g., as described in connection with 504 in FIGS. 5 and 604 in FIG. 6. The non-serving cell measurement component 940 may be further configured to perform, based on the received configuration, the L1/L2 measurements of the at least one target RS, e.g., as described in connection with 606 in FIG. 6. The non-serving cell measurement component 940 may be further configured to generate the measurement report including the measurement information, the measurement report being generated to include measurement information for a number of RS associated with the non-serving cell, the number of RS reported in the measurement report being limited by the UE, e.g., as described in connection with 608 in FIG. 6. The non-serving cell measurement component 940 may be further configured to report, to the serving cell, a measurement report including the measurement information associated with the performed L1/L2 measurement, e.g., as described in connection with 610 in FIG. 6.

The apparatus may include additional components that perform each of the blocks of the algorithm in the flowcharts of FIGS. 4-6. As such, each block in the flowcharts of FIGS. 4-6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, includes means for transmitting, to a serving cell, UE capability information for performing L1/L2 measurements of at least one target RS received from a non-serving cell and reporting measurement information. The apparatus 902, and in particular the cellular baseband processor 904, may further include means for receiving, based on the transmitted UE capability information, a configuration including a TCI state scheduling the UE to receive the at least one target RS from the non-serving cell based on at least one source RS associated with the TCI state, and to perform the L1/L2 measurements of the at least one target RS.

In one configuration, the apparatus 902, and in particular the cellular baseband processor 904, may further include means for performing, based on the received configuration, the L1/L2 measurements of the at least one target RS. The apparatus 902, and in particular the cellular baseband processor 904, may further include means for reporting, to the serving cell, a measurement report including the measurement information associated with the performed L1/L2 measurements. In one configuration, the apparatus 902, and in particular the cellular baseband processor 904, may further include means for generating the measurement report including the measurement information. The measurement report may be generated to include measurement information for a number of RS associated with the non-serving cell. The number of RS reported in the measurement report may be limited by the UE. In one configuration, the number of RS reported in the measurement report may be based on at least one of a UE capability, an indication received from the serving cell, a pre-configuration, or an indication received from the serving cell in which the indication is within the UE capability. In one configuration, the configuration may be received through one of an RRC message or a MAC-CE. In one configuration, the UE capability information may include information indicating whether the L1/L2 measurements can be performed for an SSB from the non-serving cell outside of an SMTC time period. In one configuration, the UE capability information may include at least one measurement RS type supported for the L1/L2 measurements. The at least one measurement RS type may include at least one of an SSB or a CSI-RS. In one configuration, the UE capability information may further include information indicating whether the CSI-RS supported for the L1/L2 measurements needs to be QCL with an RS. The RS may be one of a QCL source associated with a TCI state or another RS. In one configuration, the another RS may be one of an SSB or a CSI-RS. In one configuration, the UE capability information may include at least one supported measurement metric. The at least one measurement metric may include at least one of an L1-RSRP, an L1 SINR, an L3-RSRP, or an L3 SINR. In one configuration, the UE capability information may include at least one supported measurement report type. The at least one supported report type may include a periodic measurement report, a semi-persistent measurement report, or an aperiodic measurement report. In one configuration, the UE capability information may include a supported minimum time between reception of DCI scheduling a measurement report of the measurement information and transmitting the measurement report. In one configuration, the UE capability information may include a supported minimum time between reception of the at least one target RS and transmitting a measurement report of the measurement information. In one configuration, the UE capability information may include a maximum number of cells supported for the L1/L2 measurements, the cells including serving cells and non-serving cells. In one configuration, the UE capability information may include a maximum number of non-serving cells supported for the L1/L2 measurements. In one configuration, the UE capability information may include information indicating whether at least one of inter-frequency L1/L2 measurements or intra-frequency L1/L2 measurements are supported. In one configuration, the UE capability information may further include a maximum number of at least one of RS or cells supported for the at least one of the inter-frequency L1/L2 measurements or the intra-frequency L1/L2 measurements. In one configuration, the UE capability information may be transmitted to the serving cell via an RRC message.

The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 10:
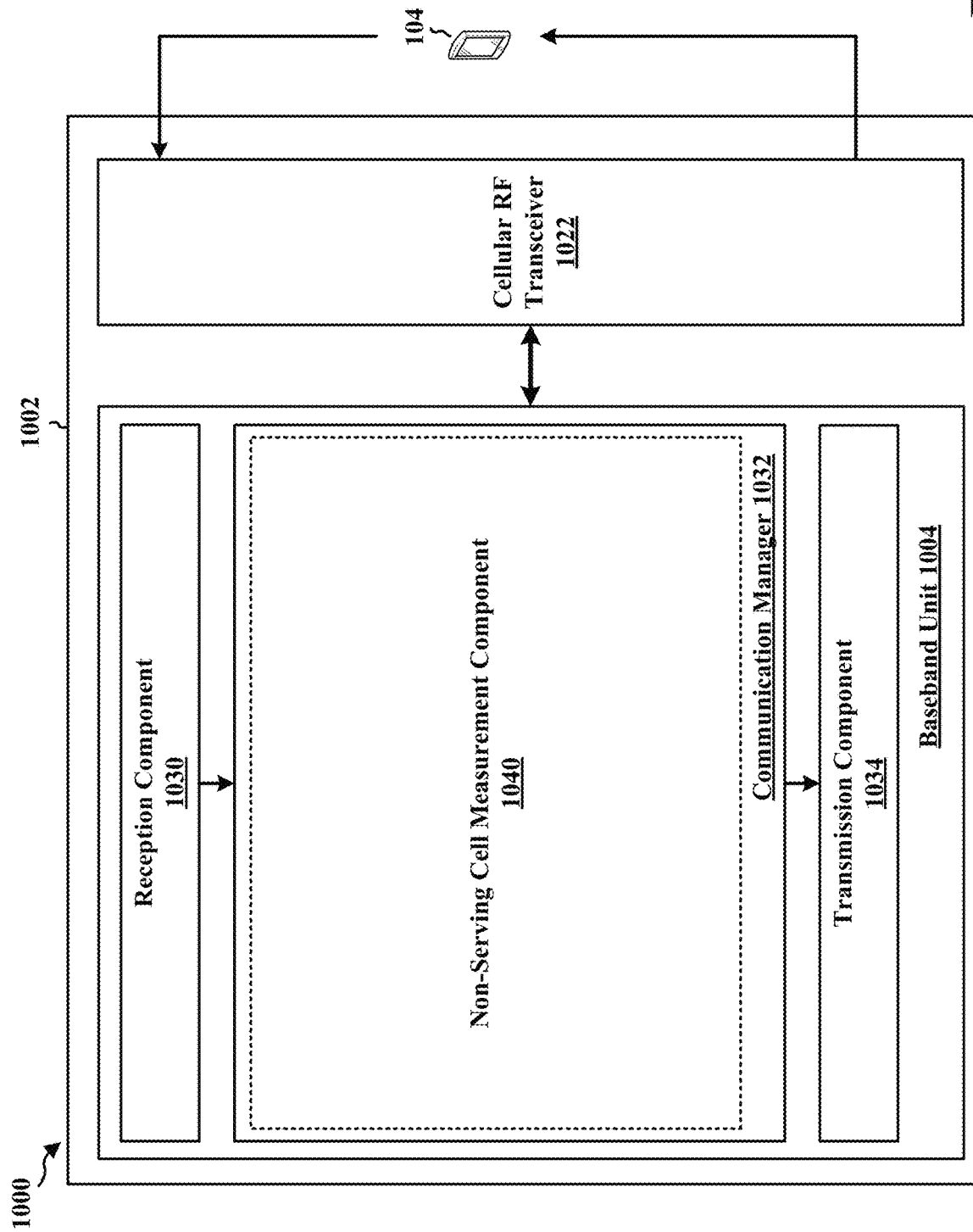
FIG. 10 is a diagram illustrating an example of a hardware implementation for an example apparatus.

FIG. 10 is a diagram 1000 illustrating an example of a hardware implementation for an apparatus 1002. The apparatus 1002 may be a base station/serving cell, a component of a base station/serving cell, or may implement base station/serving cell functionality. In some aspects, the apparatus 1002 may include a baseband unit 1004. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes a non-serving cell measurement component 1040 that may be configured to receive, from a UE, UE capability information for performing L1/L2 measurements of at least one target RS transmitted from a non-serving cell and reporting measurement information, e.g., as described in connection with 702 in FIGS. 7 and 802 in FIG. 8. The non-serving cell measurement component 1040 may be further configured to transmit, to the UE based on the received UE capability information, a configuration including a TCI state scheduling the UE to receive the at least one target RS from the non-serving cell based on at least one source RS associated with the TCI state, and to perform the L1/L2 measurements of the at least one target RS, e.g., as described in connection with 704 in FIGS. 7 and 804 in FIG. 8. The non-serving cell measurement component 1040 may be further configured to receive, from the UE, a measurement report including the measurement information associated with the L1/L2 measurements, e.g., as described in connection with 806 in FIG. 8.

The apparatus may include additional components that perform each of the blocks of the algorithm in the flowcharts of FIGS. 4, 7, and 8. As such, each block in the flowcharts of FIGS. 4, 7, and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the baseband unit 1004, includes means for receiving, from a UE, UE capability information for performing L1/L2 measurements of at least one target RS transmitted from a non-serving cell and reporting measurement information. The apparatus 1002, and in particular the baseband unit 1004, may further include means for transmitting, to the UE based on the received UE capability information, a configuration including a TCI state scheduling the UE to receive the at least one target RS from the non-serving cell based on at least one source RS associated with the TCI state, and to perform the L1/L2 measurements of the at least one target RS.

In one configuration, the apparatus 1002, and in particular the baseband unit 1004, may further include means for receiving, from the UE, a measurement report including the measurement information associated with the L1/L2 measurements. In one configuration, the measurement report may include measurement information for a number of RS associated with the non-serving cell. The number of RS reported in the measurement report may be limited by the UE. In one configuration, the number of RS reported in the measurement report may be based on at least one of a UE capability, an indication transmitted from the serving cell, a pre-configuration, or an indication transmitted from the serving cell in which the indication is within the UE capability. In one configuration, the configuration may be transmitted through one of an RRC message or a MAC-CE. In one configuration, the UE capability information may include information indicating whether the L1/L2 measurements can be performed for an SSB from the non-serving cell outside of an SMTC time period. In one configuration, the UE capability information may include at least one measurement RS type supported for the L1/L2 measurements. The at least one measurement RS type may include at least one of an SSB or a CSI-RS. In one configuration, the UE capability information may further include information indicating whether the CSI-RS supported for the L1/L2 measurements needs to be QCL with an RS. The RS may be one of a QCL source associated with a TCI state or another RS. In one configuration, the another RS may be one of an SSB or a CSI-RS. In one configuration, the UE capability information may include at least one supported measurement metric. The at least one measurement metric may include at least one of an L1-RSRP, an L1 SINR, an L3-RSRP, or an L3 SINR. In one configuration, the UE capability information may include at least one supported measurement report type. The at least one supported report type may include a periodic measurement report, a semi-persistent measurement report, or an aperiodic measurement report. In one configuration, the UE capability information may include a supported minimum time between reception of DCI scheduling a measurement report of the measurement information and transmitting the measurement report. In one configuration, the UE capability information may include a supported minimum time between reception of the at least one target RS and transmitting a measurement report of the measurement information. In one configuration, the UE capability information may include a maximum number of cells supported for the L1/L2 measurements. The cells may include serving cells and non-serving cells. In one configuration, the UE capability information may include a maximum number of non-serving cells supported for the L1/L2 measurements. In one configuration, the UE capability information may include information indicating whether at least one of inter-frequency L1/L2 measurements or intra-frequency L1/L2 measurements are supported. In one configuration, the UE capability information may further include a maximum number of at least one of RS or cells supported for the at least one of the inter-frequency L1/L2 measurements or the intra-frequency L1/L2 measurements. In one configuration, the UE capability information may be received from the UE via an RRC message.

The means may be one or more of the components of the apparatus 1002 configured to perform the functions recited by the means. As described supra, the apparatus 1002 may include the TX Processor 316, the RX Processor 370, and the controller/processor 375. As such, in one configuration, the means may be the TX Processor 316, the RX Processor 370, and the controller/processor 375 configured to perform the functions recited by the means.

Referring back to FIGS. 4-10, L1/L2 measurements of RS from non-serving cells may be needed to enable L1/L2 centric inter-cell mobility. As discussed above, some aspects may relate to reporting of UE capability information relating to L1/L2 measurements of RS from non-serving cells to the serving cell. The UE may receive from the serving cell a configuration including a TCI state scheduling the UE to receive at least one target RS from the non-serving cell based on at least one source RS associated with the TCI state, and to perform the L1/L2 measurements of the at least one target RS. The L1/L2 measurements of RS from non-serving cells may be performed accordingly. The measurement report may be transmitted to the serving cell to enable L1/L2 centric inter-cell mobility. Faster mobility operations (e.g., handovers) may be achieved.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to transmit, to a serving cell, UE capability information for performing L1/L2 measurements of at least one target RS received from a non-serving cell and reporting measurement information; and receive, based on the transmitted UE capability information, a configuration including a TCI state scheduling the UE to receive the at least one target RS from the non-serving cell based on at least one source RS associated with the TCI state, and to perform the L1/L2 measurements of the at least one target RS.

Aspect 2 is the apparatus of aspect 1, the at least one processor being further configured to: perform, based on the received configuration, the L1/L2 measurements of the at least one target RS; and report, to the serving cell, a measurement report including the measurement information associated with the performed L1/L2 measurements.

Aspect 3 is the apparatus of aspect 2, the at least one processor being further configured to generate the measurement report including the measurement information, the measurement report being generated to include measurement information for a number of RS associated with the non-serving cell, the number of RS reported in the measurement report being limited by the UE.

Aspect 4 is the apparatus of aspect 3, where the number of RS reported in the measurement report is based on at least one of a UE capability, an indication received from the serving cell, a pre-configuration, or an indication received from the serving cell in which the indication is within the UE capability.

Aspect 5 is the apparatus of any of aspects 1 to 4, where the configuration is received through one of an RRC message or a MAC-CE.

Aspect 6 is the apparatus of any of aspects 1 to 5, where the UE capability information includes information indicating whether the L1/L2 measurements can be performed for an SSB from the non-serving cell outside of an SMTC time period.

Aspect 7 is the apparatus of any of aspects 1 to 6, where the UE capability information includes at least one measurement RS type supported for the L1/L2 measurements, the at least one measurement RS type including at least one of an SSB or a CSI-RS.

Aspect 8 is the apparatus of aspect 7, where the UE capability information further includes information indicating whether the CSI-RS supported for the L1/L2 measurements needs to be QCL with an RS, the RS being one of a QCL source associated with a TCI state or another RS.

Aspect 9 is the apparatus of aspect 8, where the another RS is one of an SSB or a CSI-RS.

Aspect 10 is the apparatus of any of aspects 1 to 9, where the UE capability information includes at least one supported measurement metric, the at least one measurement metric including at least one of an L1-RSRP, an L1 SINR, an L3-RSRP, or an L3 SINR.

Aspect 11 is the apparatus of any of aspects 1 to 10, where the UE capability information includes at least one supported measurement report type, the at least one supported report type including a periodic measurement report, a semi-persistent measurement report, or an aperiodic measurement report.

Aspect 12 is the apparatus of any of aspects 1 to 11, where the UE capability information includes a supported minimum time between reception of DCI scheduling a measurement report of the measurement information and transmitting the measurement report.

Aspect 13 is the apparatus of any of aspects 1 to 12, where the UE capability information includes a supported minimum time between reception of the at least one target RS and transmitting a measurement report of the measurement information.

Aspect 14 is the apparatus of any of aspects 1 to 13, where the UE capability information includes a maximum number of cells supported for the L1/L2 measurements, the cells including serving cells and non-serving cells.

Aspect 15 is the apparatus of any of aspects 1 to 14, where the UE capability information includes a maximum number of non-serving cells supported for the L1/L2 measurements.

Aspect 16 is the apparatus of any of aspects 1 to 15, where the UE capability information includes information indicating whether at least one of inter-frequency L1/L2 measurements or intra-frequency L1/L2 measurements are supported.

Aspect 17 is the apparatus of aspect 16, where the UE capability information further includes a maximum number of at least one of RS or cells supported for the at least one of the inter-frequency L1/L2 measurements or the intra-frequency L1/L2 measurements.

Aspect 18 is the apparatus of any of aspects 1 to 17, where the UE capability information is transmitted to the serving cell via an RRC message.

Aspect 19 is the apparatus of any of aspects 1 to 18, further comprising a transceiver coupled to the at least one processor.

Aspect 20 is an apparatus for wireless communication at a serving cell including at least one processor coupled to a memory and configured to receive, from a UE, UE capability information for performing L1/L2 measurements of at least one target RS transmitted from a non-serving cell and reporting measurement information; and transmit, to the UE based on the received UE capability information, a configuration including a TCI state scheduling the UE to receive the at least one target RS from the non-serving cell based on at least one source RS associated with the TCI state, and to perform the L1/L2 measurements of the at least one target RS.

Aspect 21 is the apparatus of aspect 20, the at least one processor being further configured to receive, from the UE, a measurement report including the measurement information associated with the L1/L2 measurements.

Aspect 22 is the apparatus of aspect 21, where the measurement report includes measurement information for a number of RS associated with the non-serving cell, the number of RS reported in the measurement report being limited by the UE.

Aspect 23 is the apparatus of aspect 22, where the number of RS reported in the measurement report is based on at least one of a UE capability, an indication transmitted from the serving cell, a pre-configuration, or an indication transmitted from the serving cell in which the indication is within the UE capability.

Aspect 24 is the apparatus of any of aspects 20 to 23, where the configuration is transmitted through one of an RRC message or a MAC-CE.

Aspect 25 is the apparatus of any of aspects 20 to 24, where the UE capability information includes information indicating whether the L1/L2 measurements can be performed for an SSB from the non-serving cell outside of an SMTC time period.

Aspect 26 is the apparatus of any of aspects 20 to 25, where the UE capability information includes at least one measurement RS type supported for the L1/L2 measurements, the at least one measurement RS type including at least one of an SSB or a CSI-RS.

Aspect 27 is the apparatus of any of aspects 20 to 26, where the UE capability information further includes information indicating whether the CSI-RS supported for the L1/L2 measurements needs to be QCL with an RS, the RS being one of a QCL source associated with a TCI state or another RS.

Aspect 28 is the apparatus of aspect 27, where the another RS is one of an SSB or a CSI-RS.

Aspect 29 is the apparatus of any of aspects 20 to 28, where the UE capability information includes at least one supported measurement metric, the at least one measurement metric including at least one of an L1-RSRP, an L1 SINR, an L3-RSRP, or an L3 SINR.

Aspect 30 is the apparatus of any of aspects 20 to 29, where the UE capability information includes at least one supported measurement report type, the at least one supported report type including a periodic measurement report, a semi-persistent measurement report, or an aperiodic measurement report.

Aspect 31 is the apparatus of any of aspects 20 to 30, where the UE capability information includes a supported minimum time between reception of DCI scheduling a measurement report of the measurement information and transmitting the measurement report.

Aspect 32 is the apparatus of any of aspects 20 to 31, where the UE capability information includes a supported minimum time between reception of the at least one target RS and transmitting a measurement report of the measurement information.

Aspect 33 is the apparatus of any of aspects 20 to 32, where the UE capability information includes a maximum number of cells supported for the L1/L2 measurements, the cells including serving cells and non-serving cells.

Aspect 34 is the apparatus of any of aspects 20 to 33, where the UE capability information includes a maximum number of non-serving cells supported for the L1/L2 measurements.

Aspect 35 is the apparatus of any of aspects 20 to 34, where the UE capability information includes information indicating whether at least one of inter-frequency L1/L2 measurements or intra-frequency L1/L2 measurements are supported.

Aspect 36 is the apparatus of aspect 35, where the UE capability information further includes a maximum number of at least one of RS or cells supported for the at least one of the inter-frequency L1/L2 measurements or the intra-frequency L1/L2 measurements.

Aspect 37 is the apparatus of any of aspects 20 to 36, where the UE capability information is received from the UE via an RRC message.

Aspect 38 is the apparatus of any of aspects 20 to 37, further comprising a transceiver coupled to the at least one processor.

Aspect 39 is a method of wireless communication for implementing any of aspects 1 to 38.

Aspect 40 is an apparatus for wireless communication including means for implementing any of aspects 1 to 38.

Aspect 41 is a computer-readable medium storing computer executable code, where the code when executed by a processor causes the processor to implement any of aspects 1 to 38.

What is claimed is:

1. An apparatus for wireless communication at a user equipment (UE), comprising:
memory; and
at least one processor coupled to the memory and configured to:
transmit, to a serving cell, UE capability information for performing at least one of layer 1 (L1) or layer 2 (L2) (L1/L2) measurements of at least one target reference signal (RS) received from a non-serving cell and reporting measurement information, wherein the UE capability information comprises a maximum number of cells supported for the L1/L2 measurements; and
receive, based on the transmitted UE capability information, a configuration including a transmission configuration indicator (TCI) state scheduling the UE to receive the at least one target RS from the non-serving cell based on at least one source RS associated with the TCI state, and to perform the L1/L2 measurements of the at least one target RS.

2. The apparatus of claim 1, the at least one processor being further configured to:
perform, based on the received configuration, the L1/L2 measurements of the at least one target RS; and
report, to the serving cell, a measurement report including the measurement information associated with the performed L1/L2 measurements.

3. The apparatus of claim 2, the at least one processor being further configured to generate the measurement report including the measurement information, the measurement report being generated to include measurement information for a number of RS associated with the non-serving cell, the number of RS reported in the measurement report being limited by the UE.

4. The apparatus of claim 3, wherein the number of RS reported in the measurement report is based on at least one of a UE capability, an indication received from the serving cell, a pre-configuration, or an indication received from the serving cell in which the indication is within the UE capability.

5. The apparatus of claim 1, wherein to receive the configuration, the at least one processor is configured to receive the configuration through one of a radio resource control (RRC) message or a medium access control (MAC) control element (CE) (MAC-CE).

6. The apparatus of claim 1, wherein the UE capability information comprises information indicating whether the L1/L2 measurements can be performed for a synchronization signal block (SSB) from the non-serving cell outside of an SSB based measurement timing configuration (SMTC) time period.

7. The apparatus of claim 1, wherein the UE capability information comprises at least one measurement RS type supported for the L1/L2 measurements, the at least one measurement RS type including at least one of a synchronization signal block (SSB) or a channel state information (CSI) RS (CSI-RS).

8. The apparatus of claim 7, wherein the UE capability information further comprises information indicating whether the CSI-RS supported for the L1/L2 measurements needs to be quasi-co located (QCL) with an RS, the RS being one of a QCL source associated with a TCI state or another RS.

9. The apparatus of claim 8, wherein the another RS is one of an SSB or a CSI-RS.

10. The apparatus of claim 1, wherein the UE capability information comprises at least one supported measurement metric, the at least one measurement metric including at least one of an L1 reference signal received power (RSRP)

(L1-RSRP), an L1 signal to interference plus noise ratio (SINR), an L3 RSRP (L3-RSRP), or an L3 SINR.

11. The apparatus of claim 1, wherein the UE capability information comprises at least one supported measurement report type, the at least one supported report type including a periodic measurement report, a semi-persistent measurement report, or an aperiodic measurement report.

12. The apparatus of claim 1, wherein the UE capability information comprises a supported minimum time between reception of downlink control information (DCI) scheduling a measurement report of the measurement information and transmitting the measurement report.

13. The apparatus of claim 1, wherein the UE capability information comprises a supported minimum time between reception of the at least one target RS and transmitting a measurement report of the measurement information.

14. The apparatus of claim 1, wherein the cells include serving cells and non-serving cells.

15. The apparatus of claim 1, wherein the cells include non-serving cells and not serving cells.

16. The apparatus of claim 1, wherein the UE capability information comprises information indicating whether at least one of inter-frequency L1/L2 measurements or intra-frequency L1/L2 measurements are supported.

17. The apparatus of claim 16, wherein the UE capability information further comprises a maximum number of at least one of RS or cells supported for the at least one of the inter-frequency L1/L2 measurements or the intra-frequency L1/L2 measurements.

18. The apparatus of claim 1, further comprising a transceiver coupled to the at least one processor, wherein to transmit the UE capability information, the at least one processor is configured to transmit the UE capability information to the serving cell via a radio resource control (RRC) message.

19. A method of wireless communication at a user equipment (UE), comprising:
  transmitting, to a serving cell, UE capability information for performing at least one of layer 1 (L1) or layer 2 (L2) (L1/L2) measurements of at least one target reference signal (RS) received from a non-serving cell and reporting measurement information, wherein the UE capability information comprises a maximum number of cells supported for the L1/L2 measurements; and
  receiving, based on the transmitted UE capability information, a configuration including a transmission configuration indicator (TCI) state scheduling the UE to receive the at least one target RS from the non-serving cell based on at least one source RS associated with the TCI state, and to perform the L1/L2 measurements of the at least one target RS.

20. An apparatus for wireless communication at a serving cell, comprising:
  memory; and
  at least one processor coupled to the memory and configured to:
    receive, from a user equipment (UE), UE capability information for performing at least one of layer 1 (L1) or layer 2 (L2) (L1/L2) measurements of at least one target reference signal (RS) transmitted from a non-serving cell and reporting measurement information, wherein the UE capability information comprises a maximum number of cells supported for the L1/L2 measurements; and
    transmit, to the UE based on the received UE capability information, a configuration including a transmission configuration indicator (TCI) state scheduling the UE to receive the at least one target RS from the non-serving cell based on at least one source RS associated with the TCI state, and to perform the L1/L2 measurements of the at least one target RS.

21. The apparatus of claim 20, the at least one processor being further configured to receive, from the UE, a measurement report including the measurement information associated with the L1/L2 measurements.

22. The apparatus of claim 21, wherein the measurement report includes measurement information for a number of RS associated with the non-serving cell, the number of RS reported in the measurement report being limited by the UE.

23. The apparatus of claim 22, wherein the number of RS reported in the measurement report is based on at least one of a UE capability, an indication transmitted from the serving cell, a pre-configuration, or an indication transmitted from the serving cell in which the indication is within the UE capability.

24. The apparatus of claim 20, wherein to transmit the configuration, the at least one processor is configured to transmit the configuration through one of a radio resource control (RRC) message or a medium access control (MAC) control element (CE) (MAC-CE).

25. The apparatus of claim 20, wherein the UE capability information comprises information indicating whether the L1/L2 measurements can be performed for a synchronization signal block (SSB) from the non-serving cell outside of an SSB based measurement timing configuration (SMTC) time period.

26. The apparatus of claim 20, wherein the UE capability information comprises at least one measurement RS type supported for the L1/L2 measurements, the at least one measurement RS type including at least one of a synchronization signal block (SSB) or a channel state information (CSI) RS (CSI-RS).

27. The apparatus of claim 26, wherein the UE capability information further comprises information indicating whether the CSI-RS supported for the L1/L2 measurements needs to be quasi-co located (QCL) with an RS, the RS being one of a QCL source associated with a TCI state or another RS.

28. The apparatus of claim 27, wherein the another RS is one of an SSB or a CSI-RS.

29. The apparatus of claim 20, further comprising a transceiver coupled to the at least one processor, wherein the UE capability information comprises at least one supported measurement metric, the at least one measurement metric including at least one of an L1 reference signal received power (RSRP) (L1-RSRP), an L1 signal to interference plus noise ratio (SINR), an L3 RSRP (L3-RSRP), or an L3 SINR.

30. A method of wireless communication at a serving cell, comprising:
  receiving, from a user equipment (UE), UE capability information for performing at least one of layer 1 (L1) or layer 2 (L2) (L1/L2) measurements of at least one target reference signal (RS) transmitted from a non-serving cell and reporting measurement information, wherein the UE capability information comprises a maximum number of cells supported for the L1/L2 measurements; and
  transmitting, to the UE based on the received UE capability information, a configuration including a transmission configuration indicator (TCI) state scheduling the UE to receive the at least one target RS from the non-serving cell based on at least one source RS associated with the TCI state, and to perform the L1/L2 measurements of the at least one target RS.

* * * * *